(12) United States Patent
Ayambem et al.

(10) Patent No.: US 10,877,128 B2
(45) Date of Patent: Dec. 29, 2020

(54) WATER-RESISTANT EXTERIOR JOINT COMPOUNDS

(71) Applicant: Henry Company LLC, El Segundo, CA (US)

(72) Inventors: Amba Ayambem, Glenmoore, PA (US); Alexis Gonzalez, Springfield, PA (US)

(73) Assignee: Henry Company, LLC, El Segundo, CA (US)

( * ) Notice: Subject to any disclaimer, the term of this patent is extended or adjusted under 35 U.S.C. 154(b) by 0 days.

(21) Appl. No.: 16/401,622

(22) Filed: May 2, 2019

(65) Prior Publication Data
US 2020/0096601 A1    Mar. 26, 2020

Related U.S. Application Data

(60) Continuation of application No. 15/944,132, filed on Apr. 3, 2018, now Pat. No. 10,281,558, which is a continuation of application No. 15/804,024, filed on Nov. 6, 2017, now Pat. No. 9,964,628, which is a division of application No. 14/923,772, filed on Oct. 27, 2015, now Pat. No. 9,834,680.

(60) Provisional application No. 62/069,124, filed on Oct. 27, 2014.

(51) Int. Cl.
| | |
|---|---|
| *C08L 91/06* | (2006.01) |
| *E04B 1/68* | (2006.01) |
| *G01S 5/02* | (2010.01) |
| *C09D 5/34* | (2006.01) |
| *C09D 7/63* | (2018.01) |
| *C09D 7/65* | (2018.01) |
| *G05D 1/10* | (2006.01) |

(52) U.S. Cl.
CPC ............ *G01S 5/0289* (2013.01); *C08L 91/06* (2013.01); *C09D 5/34* (2013.01); *C09D 7/63* (2018.01); *C09D 7/65* (2018.01); *E04B 1/68* (2013.01); *G05D 1/104* (2013.01); *Y10S 901/01* (2013.01)

(58) Field of Classification Search
None
See application file for complete search history.

(56) References Cited

U.S. PATENT DOCUMENTS

| | | | | |
|---|---|---|---|---|
| 3,003,979 A | * | 10/1961 | Ptasienski | C04B 26/285 524/44 |
| 3,297,601 A | * | 1/1967 | Maynard | C04B 28/146 524/5 |
| 3,342,761 A | * | 9/1967 | Wilkinson | C04B 26/04 524/48 |
| 3,477,849 A | * | 11/1969 | Becker | G03C 8/00 430/215 |
| 3,658,564 A | * | 4/1972 | Gerow | C04B 28/26 106/605 |
| 3,707,427 A | * | 12/1972 | Erickson | E04F 21/165 118/410 |
| 4,454,267 A | * | 6/1984 | Williams | C04B 26/04 252/378 P |
| 4,657,594 A | * | 4/1987 | Struss | C04B 20/1051 106/177.1 |
| 4,897,291 A | * | 1/1990 | Kim | C08L 9/06 427/393 |
| 5,118,732 A | * | 6/1992 | Loth | C08J 3/03 524/43 |
| 5,427,722 A | * | 6/1995 | Fouts | B28B 1/265 264/86 |
| 5,437,722 A | * | 8/1995 | Borenstein | C04B 28/14 106/270 |
| 5,653,797 A | * | 8/1997 | Patel | C04B 24/2652 106/778 |
| 6,436,185 B1 | * | 8/2002 | Ayambem | C04B 24/2641 106/793 |
| 6,673,144 B2 | | 1/2004 | Immordino, Jr. et al. | |
| 6,936,099 B2 | * | 8/2005 | Ayambem | C04B 26/02 106/672 |
| 7,047,701 B2 | * | 5/2006 | Bonetto | C04B 26/04 106/638 |
| 7,294,189 B2 | | 11/2007 | Wantling | |
| 2004/0234760 A1 | * | 11/2004 | Hamed | A61L 15/60 428/375 |
| 2011/0005431 A1 | * | 1/2011 | Wantling | C04B 40/0039 106/660 |
| 2012/0263963 A1 | * | 10/2012 | Mahoney | C04B 28/14 428/484.1 |
| 2015/0159017 A1 | * | 6/2015 | Ayambem | C08L 91/06 106/172.1 |
| 2016/0115319 A1 | * | 4/2016 | Ayambem | C08L 91/06 523/122 |

FOREIGN PATENT DOCUMENTS

| | | | |
|---|---|---|---|
| AU | 2008100954 A4 * | 12/2008 | ............ C04B 26/04 |
| AU | 2008100954 A4 | 12/2008 | |
| CA | 2519489 A1 | 3/2007 | |

* cited by examiner

Primary Examiner — Peter A Salamon
(74) Attorney, Agent, or Firm — BakerHostetler

(57) ABSTRACT

Embodiments of the present disclosure are directed to joint compounds for sealing exterior sheathing wallboards applied on the exterior of buildings. This invention also relates to a process of preparing such exterior joint compounds. The joint compounds of this invention comprise an aqueous emulsion system and provide water resistance comparable to the substrate on which they are applied, that is, the exterior sheathing wallboards.

20 Claims, No Drawings

WATER-RESISTANT EXTERIOR JOINT COMPOUNDS

CROSS REFERENCE TO RELATED APPLICATIONS

The present application is a continuation of U.S. application Ser. No. 15/944,132 filed Apr. 3, 2018 which is a continuation of U.S. application Ser. No. 15/804,024 filed Nov. 6, 2017 now U.S. Pat. No. 9,964,628 issued May 8, 2018, which is a divisional of U.S. application Ser. No. 14/923,772 filed Oct. 27, 2015 now U.S. Pat. No. 9,834,680 issued Dec. 5, 2017, which claims benefit of U.S. Provisional Patent Application No. 62/069,124, filed Oct. 27, 2014, each of which is hereby incorporated by reference in its entirety.

TECHNICAL FIELD

This invention relates to joint compounds for sealing exterior sheathing wallboards applied on the exterior of buildings. This invention also relates to a process of preparing such exterior joint compounds. The joint compounds of this invention comprise an aqueous emulsion system and provide water resistance comparable to the substrate on which they are applied, that is, the exterior sheathing wallboards.

BACKGROUND

Modern techniques for constructing building walls include, for example, the two-by-four (2×4) framed construction, comprising wood or metal (such as, steel) members. These 2×4s are oriented vertically and connected at the top and bottom to similar members that are horizontally oriented. This structure is referred to in the relevant art as a "framed" wall. A sheet of building wall substrate or exterior sheathing wallboard, such as plywood sheathing, specially formulated gypsum wallboards, cement panels, or fiber cement panels are affixed to building frame.

A water-resistive barrier is then typically applied to the exterior of the sheathing wallboard, with an external wall cladding or finish then being applied directly over the water-resistive barrier. Many materials may be used for the external wall finish such as brick, stucco, vinyl or aluminum siding, and/or wood. For example, stucco exterior finishes make up one of the most common ways of finishing exteriors of both residences and commercial buildings. Stucco finishes have limitations including, porosity, rigidity, freeze/thaw fractures, fungal and mildew formation, cracking, and compromised weatherability if not applied properly. However, because modern exterior finishes are watertight, any water that remains trapped behind these finishes does not readily evaporate. The trapped water behind the exterior finish can then soak into the substrata, for example, the sheathing wallboard and framing of the building. The water that soaks into the substrata and framing often causes severe damage to the building without any signs of damage appearing on the exterior of the building. These problems can exist regardless of the age of the building or the quality of construction.

The exterior sheathing wallboards such as gypsum (or other) wall-boards used as structures, are joined at edges by joint compounds. During construction, these exterior sheathing wallboards are exposed to outside environment, which, compared to the interior environment of a building is rather severe. The exterior sheathing wallboards are exposed to UV, rain, wind, heat, cold, and other physically abrasive impactors such as debris, insects and birds, particularly during construction work. Thus, these boards are specially formulated to have weatherability and particularly water resistance of 100 g/m² or lower 2-hour water permeance or Cobb value. Just like interior drywall panels, exterior sheathing wallboard panels, when installed, have seams or joints between each panel that must be filled so that a smooth exterior finish may be applied. The joints between these exterior wall-boards or sheathing, therefore, become the weak link from where moisture can penetrate through the walls of the building and into the interior. Currently, the joint compound (or the water resistive barrier) used to seal the joints between the sheathing and to provide water resistance include a silyl-terminated-polyether (STPE) flashing membrane system. The Cobb value of such STPE systems is around 2 g/m². Stated another way, the joint compound or the sealant that is currently used is about thirty times more water resistant than the gypsum wall-boards having the much larger exposed area. The STPE based systems are not water based and therefore have inherent issues relating to dealing with organic chemical solvents. Also, these are very expensive systems.

For the exterior or the interior wallboards, to achieve a smooth, visually appealing surface, the joints between boards, cracks, screw holes, and/or nail holes must be concealed. Conventional wallboard joint compounds for the interior are used to cover and finish gypsum wallboard joints, cornerbead, and screw or nail holes. Joint compounds can be spread over mesh or tape used to connect wallboards. It may also be used to patch and texture interior walls. The intrusion of water through wall spaces, either through prolonged direct contact or via high humidity, has a debilitating effect (mold and structural damage) on standard wall systems. The result of water seepage through joint compound to the studs on the other side of the wall ultimately has devastating structural and microbial implications for the wall system, first by absorption of the seeped water into the wood studs followed by their swelling and deformation (leading to expensive structural problems) and then, the creation of a fertile ground for rapid mold growth.

Some performance requirements of exterior sheathing wallboards include (1) long-term weather-resistance; (2) mold resistance; and (3) water resistance. These performance characteristics are quite stringent, and it is to be expected that whichever material that is to be used to cover the joints between these sheathing boards (as well as the nail heads) should, at a minimum, display the same performance characteristics as that of the corresponding sheathing wallboards. It is problematic achieving all of these characteristics, especially water and weather resistance with a water-based system. This is because a water based system would have a higher propensity to degrade or be washed away with time. It is for this reason that the joint fillers for exterior sheathing boards have largely been non-water based materials such as silyl-terminated polyethers. Where water based formulations have been used, they have had to be very high in latex content and correspondingly low in water content. Formulations that are high in organic polymer content (such as STPE and water based acrylic latexes) invariably come with handling difficulties such as poor washability and undesirable odors. This invention addresses the above problems and relates to an exterior joint compound that has a significantly lower acrylic latex content, yet displays exceptional water, weather, and mold resistance. This inventive joint compound contains a specially formulated wax emulsion designed to impart exceptional water repellency to coatings formulations. Particularly, the invention relates to exterior joint compounds that are water-based but with water repellant and anti-microbial character. Because the exterior of a building especially during construction is exposed to sever weather conditions such as rain and moisture, it is counterintuitive to envision using a water-based system that can handle the harshness of the exterior environment especially when such joints serve as the weak link for moisture entry. Wax emulsions have been used in composite wallboard (e.g., gypsum wallboard) for many years for the interior in the building industry. For example, wax emulsions sold under the trade name AQUALITE® by Henry Company, and several wax emulsion formulations are disclosed in the prior art, such as U.S. Pat. No. 5,437,722. However, wax emulsions have not been used in exterior joint compounds. The inventors of this invention have arrived at a water based formulation that includes wax-based emulsion systems as one component to be used a joint compound between the exterior sheathing wallboard panels.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Disclosed herein is a water-resistant exterior joint compound which can comprise water, preservative, and wax emulsion, or silicone, or siliconate, or fluorinated compound, or stearate, or combinations thereof. In some embodiments, the exterior joint compound further comprises a rheology modifier, a binder, a thickener, and a filler. In some other embodiments of the invention the joint compound further comprises calcium carbonate, or cristobalite, or gypsum, or mica, or clay, or thickener, or a latex binder, or talc, or perlite, or expanded perlite, or combinations thereof. In yet another set of embodiments, this invention relates to an exterior joint compound that further comprises calcium carbonate, or a micro-roughened filler, or gypsum, or mica, or clay, or thickener, or a latex binder, or talc, or perlite, or expanded perlite, or combinations thereof.

In some embodiments, the above-referenced exterior joint compounds are such that the wax emulsion is configured to increase water-repellency of the joint compound.

In some embodiments of the invention the thickener comprises cellulose ether.

In some embodiment, the exterior joint compound further comprises:
about 15 to about 40 wt. % water;
about 0.1 to about 1.0 wt. % preservatives;
about 10 to about 50 wt. % calcium carbonate;
about 0.0 to about 20% mica;
about 0.0 to about 3 wt. % attapulgite clay;
about 0.0 to about 15 wt. % expanded perlite;
about 15.0 to about 40.0 wt. % wax emulsion;
about 1.0 to about 10 wt. % latex binder;
about 0.0 to 5.0% siliconate;
about 0.0 to 0.1 wt. % and
about 0.1 to about 3.0 wt. % cellulose ether thickener.

In some embodiments, the exterior joint compound described above has the wax emulsion that comprises:
water;
polyvinyl alcohol;
paraffin wax;
a base;
a dispersant; and
montan wax.

In some embodiments, the base in the wax emulsion is diethanolamine, triethanolamine, an alkali metal hydroxide, or potassium siliconate. In some other embodiments the dispersant is lignosulfonate. In yet other embodiments the wax emulsion comprises paraffin wax, or montan wax, or carnauba wax, or sunflower wax, or rice wax, or tallow wax, or a wax containing organic acids and/or esters, or an emulsifier containing a mixture of organic acids such as stearic acid and/or esters, or synthetic wax or combinations thereof.

In some embodiments, the wax emulsion is stabilized with polyvinyl alcohol. In some other embodiments, the joint compound has a pH below 9. In yet other embodiments, the exterior joint compound has a contact angle of about 60 to about 110 degrees. In some embodiments, the joint compound has a Cobb value of about 5.0 to about 100 grams per square meter.

In some embodiment, the exterior joint compound comprises a wax emulsion; and silicones, or siliconates, or fluorinated compounds, or stearates, or combinations thereof. In some embodiments, such silicones, siliconates, fluorinated compounds, or stearates are selected from the group consisting of metal siliconate salts, potassium siliconate, poly hydrogen methyl siloxane, polydimethyl siloxane, stearate-based salts, and combinations thereof.

This invention also relates to a method of applying water-resistant exterior joint compounds described above, comprising the steps of:
mixing a combination of:
  water;
  preservative; and
  wax emulsion, or silicone, or siliconate, or a fluorinated compound, or stearate, or combinations thereof to form a water-resistant joint compound; and
applying the water-resistant joint compound to an exterior sheathing wallboard.

DETAILED DESCRIPTION

Embodiments of the present disclosure provide a water-resistant exterior joint compound formed from a wax emulsion. The joint compound may optionally be used to create a water resistant barrier at exterior wall joints, as well as at holes, such as nail holes, through a wall, thereby preventing moisture from passing through the walls. The joint compound may optionally be used, for example, in construction of houses or commercial buildings. The joint compound can contain, in some embodiments, a montan activated and polyvinyl alcohol stabilized wax emulsion. By doing so, the resulting dried joint compound surface can exhibit a high contact angle, which can lead to exceptional water repellency. Further, the disclosed joint compound formed from a wax emulsion can avoid deleterious effects on key desirable performance properties of the joint compound.

By "microbe mitigating", it is meant that applying the exterior joint compound comprising one or more biocides reduces a microbe population by direct cidal action, by substantial arrest of cell division or cellular respiration and/or any other mechanism of action; reduces the rate of proliferation of a microbe population; and/or substantially prevents the establishment of a microbe population on a surface to which the barrier or emulsion is applied; as compared to the same activity(ies) or a surface that does not bear the emulsion or barrier of the invention.

By "microbe" it is meant any of one or more prokaryotic or eukaryotic single or multi-celled organisms, including, for example, bacteria, molds, lichens, algae, organisms of kingdom fungi (including yeasts), organisms conventionally regarded as protists, organisms of the kingdom formerly known as Monera, viruses, and amoebae.

By "effective amount," it is meant an amount sufficient to prevent, eliminate, and/or reduce growth of a microbe population on a surface.

The joint compound can be used to create a moisture resistant joint compound that can, for example, complement and be used on moisture resistant gypsum boards specially formulated for the exterior environment during construction. These boards, along with the joint compound, can be used in moisture situations, for example during rain or high humidity exposure of exterior sheathing. The use of the moisture resistant boards and joint compounds can help to reduce the susceptibility of the walls, and the studs behind the walls, to mold growth and structural deformation caused through the absorption of water, reducing damage and health risks.

The terms "approximately", "about", and "substantially" as used herein represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount.

Certain example embodiments of the joint compound can be generally prepared from an improved wax emulsion, among other materials and additives. More details on example embodiments of the different materials are disclosed herein.

Wax Emulsions Including Moisture Resistant Stabilizers

Embodiments of an improved wax emulsion for use in a water-resistant exterior joint compound are now described in greater detail, as follows. An embodiment of the wax emulsion comprises water, a base, at least one wax selected from slack wax, montan wax, and paraffin wax, and a polymeric stabilizer, such as ethylene-vinyl alcohol-vinyl acetate terpolymer or polyvinyl alcohol. Further, carnauba wax, sunflower wax, tall oil, tallow wax, rice wax, and any other natural or synthetic wax or emulsifier containing organic acids and/or esters can be used to form the wax emulsion.

Waxes

Waxes described herein can be used in the present invention. For the purposes of some embodiments of the present invention, waxes include naturally occurring waxes and synthetic waxes. Naturally occurring waxes include plant based waxes, animal based waxes, and mineral waxes. Synthetic waxes are made by physical or chemical processes.

Examples of plant based waxes include mixtures of unesterified hydrocarbons, which may predominate over esters. The epicuticular waxes of plants are mixtures of substituted long-chain aliphatic hydrocarbons, containing alkanes, alkyl esters, sterol esters, fatty acids, primary and secondary alcohols, diols, ketones, aldehydes, aliphatic aldehydes, primary and secondary alcohols, β-diketones, triacylglycerols, and many more. The nature of the other lipid constituents can vary greatly with the source of the waxy material, but they include hydrocarbons, Plant leaf surfaces are coated with a thin layer of waxy material. Specific examples of plant wax include Carnauba wax, which is a hard wax obtained from the Brazilian palm *Copernicia prunifera*, which contains the ester myricyl cerotate. Other plant based waxes include candelilla wax, ouricury wax, jojoba plant wax, bayberry wax, Japan wax, sunflower wax, tall oil, tallow wax, rice wax, and tallows.

Animal wax includes beeswax as well as waxes secreted by other insects. A major component of the beeswax used in constructing honeycombs is the ester myricyl palmitate which is an ester of triacontanol and palmitic acid. Spermaceti occurs in large amounts in the head oil of the sperm whale. One of its main constituents is cetyl palmitate, another ester of a fatty acid and a fatty alcohol. Lanolin is a wax obtained from wool, consisting of esters of sterols. Other animal wax examples include lanocerin, shellac, and ozokerite.

Examples of mineral waxes include montan wax, paraffin wax, microcrystalline wax and intermediate wax. Although many natural waxes contain esters, paraffin waxes are hydrocarbons, mixtures of alkanes usually in a homologous series of chain lengths. Paraffin waxes are mixtures of saturated n- and iso-alkanes, naphthenes, and alkyl- and naphthene-substituted aromatic compounds. The degree of branching has an important influence on the properties. Montan wax is a fossilized wax extracted from coal and lignite. It is very hard, reflecting the high concentration of saturated fatty acids/esters and alcohols. Montan wax includes chemical components formed of long chain alkyl acids and alkyl esters having chain lengths of about 24 to 30 carbons. In addition, natural montan includes resin acids, polyterpenes and some alcohol, ketone and other hydrocarbons such that it is not a "pure" wax. The saponification number of montan, which is a saponifiable wax, is about 92 and its melting point is about 80° C. In addition to montan wax, other naturally derived waxes are known for use in various industries and include petroleum waxes derived from crude oil after processing, which include macrocrystalline wax, microcrystalline wax, petrolatum and paraffin wax. Paraffin wax is also a natural wax derived from petroleum and formed principally of straight-chain alkanes having average chain lengths of 20-30 carbon atoms.

Synthetic waxes include waxes based on polypropylene, polyethylene, and polytetrafluoroethylene. Other synthetic waxes are based on fatty acid amines, Fischer Tropsch, and polyamides. Polyethylene and related derivatives. Some waxes are obtained by cracking polyethylene at 400° C. The products have the formula $(CH_2)_nH_2$, where n ranges between about 50 and 100.

Also outside of the building products context, in addition to waxes that occur in natural form, there are various known synthetic waxes which include synthetic polyethylene wax of low molecular weight, i.e., molecular weights of less than about 10,000, and polyethylenes that have wax-like properties. Such waxes can be formed by direct polymerization of ethylene under conditions suitable to control molecular weight. Polyethylenes with molecular weights in about the 2,000-4,000 range are waxes, and when in the range of about 4,000-12,000 become wax resins.

Fischer-Tropsch waxes are polymethylene waxes produced by a particular polymerization synthesis, specifically, a Fischer-Tropsch synthesis (polymerization of carbon monoxide under high pressure, high temperature and special catalysts to produce hydrocarbon, followed by distillation to separate the products into liquid fuels and waxes). Such waxes (hydrocarbon waxes of microcrystalline, polyethylene and polymethylene types) can be chemically modified by, e.g., air oxidation (to give an acid number of 30 or less and a saponification number no lower than 25) or modified with maleic anhydride or carboxylic acid. Such modified waxes are more easily emulsified in water and can be saponified or esterified. Other known synthetic waxes are polymerized alpha-olefins. These are waxes formed of higher alpha-olefins of 20 or more carbon atoms that have wax like properties. The materials are very branched with broad molecular weight distributions and melting points ranging about 54° C. to 75° C. with molecular weights of about 2,600 to 2,800. Thus, waxes differ depending on the nature of the base material as well as the polymerization or synthesis process, and resulting chemical structure, including the use and type of any chemical modification.

Various types of alpha-olefin and other olefinic synthetic waxes are known within the broad category of waxes, as are chemically modified waxes, and have been used in a variety of applications, outside the water-resistant wallboard area. They are of a wide variety and vary in content and chemical structure. As noted above, water-resistant wallboard products generally use paraffin, paraffin and montan, or other paraffinic or synthetic waxes as described above in the mentioned exemplary patent references. While various waxes and wax substitutes have been used and tried in the building products area for wax emulsions generally, particularly in some cases with a goal toward finding an adequate substitute for use of montan wax, the waxes as have been adopted to date do not include normal alpha-olefin or oxidized alpha-olefin waxes.

Water may be provided to the emulsion, for example in amounts of about 30% to about 60% by weight of the emulsion. The solids content of the wax emulsion is preferably about 40% to about 70% by weight of the emulsion. Other amounts may be used.

In some embodiments, a dispersant and/or a surfactant may be employed in the improved wax emulsions. Optional dispersants, include, but are not limited to those having a sulfur or a sulfur-containing group(s) in the compound such as sulfonic acids (R—S(═O)$_2$—OH) and their salts, wherein the R groups may be otherwise functionalized with hydroxyl, carboxyl or other useful bonding groups. In some embodiments, higher molecular weight sulfonic acid compounds such as lignosulfonate, lignosulfonic acid, and naphthalene sulfonic acid, sulfonate salts of these acids and derivatized or functionalized versions of these materials are used in addition or instead. An example lignosulfonic acid salt is Polyfon® H available from MeadWestvaco Corporation, Charleston, S.C. Other dispersants may be used, such as magnesium sulfate, polycarboxylate technology, ammonium hepta molybdate/starch combinations, non-ionic surfactants, ionic surfactants, zwitterionic surfactants and mixtures thereof, alkyl quaternary ammonium montmorillonite clay, etc. Similar materials may also be used, where such materials may be compatible with and perform well with the formulation components. The wax component of the emulsion may include at least one wax which may be slack wax, montan wax and/or slack wax. The total wax content may be about 30% to about 60%, more preferably about 30% to about 40% by weight of the emulsion. Slack wax may be any suitable slack wax known or to be developed which incorporates a material that is a higher petroleum refining fraction of generally up to about 20% by weight oil. In addition to, or as an alternative to slack wax, paraffin waxes of a more refined fraction are also useful within the scope of the invention.

Suitable paraffin waxes may be any suitable paraffin wax, and preferably paraffins of melting points of from about 40° C. to about 110° C., although lower or higher melting points may be used if drying conditions are altered accordingly using any techniques known or yet to be developed in the composite board manufacturing arts or otherwise. Thus, petroleum fraction waxes, either paraffin or microcrystalline, and which may be either in the form of varying levels of refined paraffins, or less refined slack wax may be used. Optionally, synthetic waxes such as ethylenic polymers or hydrocarbon types derived via Fischer-Tropsch synthesis may be included in addition or instead, however paraffins or slack waxes are preferred in certain embodiments. Montan wax, which is also known in the art as lignite wax, is a hard, naturally occurring wax that is typically dark to amber in color (although lighter, more refined montan waxes are also commercially available). Montan is insoluble in water, but is soluble in solvents such as carbon tetrachloride, benzene and chloroform. In addition to naturally derived montan wax, alkyl acids and/or alkyl esters which are derived from high molecular weight fatty acids of synthetic or natural sources with chain lengths preferably of over 18 carbons, more preferably from 26 to 46 carbons that function in a manner similar to naturally derived montan wax are also within the scope of the invention and are included within the scope of "montan wax" as that term is used herein unless the context indicates otherwise (e.g., "naturally occurring montan wax"). Such alkyl acids are generally described as being of formula R—COOH, where R is an alkyl non-polar group which is lipophilic and can be from 18 to more than 200 carbons. An example of such a material is octacosanoic acid and its corresponding ester which is, for example, a di-ester of that acid with ethylene glycol. The COOH group forms hydrophilic polar salts in the presence of alkali metals such as sodium or potassium in the emulsion. While the alkyl portion of the molecule gets embedded within the paraffin, the acid portion is at the paraffin/aqueous medium interface, providing stability to the emulsion. Other components which may be added include esterified products of the alkyl acids with alcohols or glycols.

In some embodiments, the at least one wax component of the emulsion includes primarily and, preferably completely a slack wax component. In some embodiments, the at least one wax component is made up of a combination of paraffin wax and montan wax or of slack wax and montan wax. Although it should be understood that varying combinations of such waxes can be used. When using montan wax in combination with one or more of the other suitable wax components, it is preferred that montan be present in an amount of about 0.1% to about 10%, more preferably about 1% to about 4% by weight of the wax emulsion with the remaining wax or waxes present in amounts of from about 30% to about 50%, more preferably about 30% to about 35% by weight of the wax emulsion.

In some embodiments, the wax emulsion includes polyvinyl alcohol (PVOH) of any suitable grade which is at least partially hydrolyzed. The preferred polyvinyl alcohol is at least 80%, and more preferably at least 90%, and most preferably about 97-100% hydrolyzed polyvinyl acetate. Suitably, the polyvinyl alcohol is soluble in water at elevated temperatures of about 60° C. to about 95° C., but insoluble in cold water. The hydrolyzed polyvinyl alcohol is preferably included in the emulsion in an amount of up to about 5% by weight, preferably 0.1% to about 5% by weight of the emulsion, and most preferably about 2% to about 3% by weight of the wax emulsion.

In some embodiments, the stabilizer comprises a polymer that is capable of hydrogen bonding to the carboxylate or similar moieties at the water/paraffin interface. Polymers that fit the hydrogen-bonding requirement would have such groups as hydroxyl, amine, and/or thiol, amongst others, along the polymer chain. Reducing the polymer's affinity for water (and thus, its water solubility) could be achieved by inserting hydrophobic groups such as alkyl, alkoxy silanes, or alkyl halide groups into the polymer chain. The result may be a polymer such as ethylene-vinyl acetate-vinyl alcohol terpolymer (where the vinyl acetate has been substantially hydrolyzed). The vinyl acetate content may be between 0% to 15%. In some embodiments, the vinyl acetate content is between 0% and 3% of the terpolymer chain. The ethylene-vinyl alcohol-vinyl acetate terpolymer may be included in the emulsion in an amount of up to about 10.0% by weight, preferably 0.1% to about 5.0% by weight of the emulsion. In some embodiments, ethylene-vinyl alcohol-vinyl acetate terpolymer may be included in the emulsion in an amount of about 2% to about 3% by weight of the wax emulsion. An example ethylene-vinyl alcohol-vinyl acetate terpolymer that is available is the Exceval AQ4104™, available from Kuraray Chemical Company.

The wax emulsion may include a stabilizer material (e.g., PVOH, ethylene-vinyl alcohol-vinyl acetate terpolymer as described above). The stabilizer may be soluble in water at elevated temperatures similar to those disclosed with reference to PVOH (e.g., about 60° C. up to about 95° C.), but insoluble in cold water. The active species in the wax component (e.g., montan wax) may be the carboxylic acids and esters, which may comprise as much as 90% of the wax. These chemical groups may be converted into carboxylate moieties upon hydrolysis in a high pH environment (e.g., in an environment including aqueous KOH). The carboxylate moieties may act as a hydrophilic portion or "head" of the molecule. The hydrophilic portions can directly interface with the surrounding aqueous environment, while the rest of the molecule, which may be a lipophilic portion or "tail", may be embedded in the wax.

A stabilizer capable of hydrogen bonding to carboxylate moieties (e.g., PVOH or ethylene-vinyl alcohol-vinyl acetate terpolymer as described above) may be used in the wax emulsion. The polar nature of the carboxylate moiety may offer an optimal anchoring point for a stabilizer chain through hydrogen bonding. When stabilizer chains are firmly anchored to the carboxylate moieties as described above, the stabilizer may provide emulsion stabilization through steric hindrance. In embodiments where the wax emulsion is subsequently dispersed in a wallboard (e.g., gypsum board) system, all the water may be evaporated away during wallboard manufacture. The stabilizer may then function as a gate-keeper for repelling moisture. Decreasing the solubility of the stabilizer in water may improve the moisture resistance of the wax emulsion and the wallboard. For example, fully hydrolyzed PVOH may only dissolve in heated, and not cool, water. For another example, ethylene-vinyl alcohol-vinyl acetate terpolymer may be even less water soluble than PVOH. The ethylene repeating units may reduce the overall water solubility. Other stabilizer materials are also possible. For example, polymers with hydrogen bonding capability such as those containing specific functional groups, such as alcohols, amines, and thiols, may also be used. For another example, vinyl alcohol-vinyl acetate-silyl ether terpolymer can be used. An example vinyl alcohol-vinyl acetate-silyl ether terpolymer is Exceval R-2015, available from Kuraray Chemical Company. In some embodiments, combinations of stabilizers are used.

In some embodiments, the wax emulsion comprises a base. For example, the wax emulsion may comprise an alkali metal hydroxide, such as potassium hydroxide or other suitable metallic hydroxide, such as aluminum, barium, calcium, lithium, magnesium, sodium and/or zinc hydroxide. These materials may serve as saponifying agents. Non-metallic bases such as derivatives of ammonia as well as amines (e.g., diethanolamine or triethanolamine) can also be used. Combinations of the above-mentioned materials are also possible. If included in the wax emulsion, potassium hydroxide is preferably present in an amount of 0% to 1%, more preferably about 0.1% to about 0.5% by weight of the wax emulsion.

In some embodiments, an exemplary wax emulsion comprises: about 30% to about 60% by weight of water; about 0.1% to about 5% by weight of a lignosulfonic acid or a salt thereof; about 0% to about 1% by weight of potassium hydroxide; about 30% to about 50% by weight of wax selected from the group consisting of paraffin wax, slack wax and combinations thereof; and about 0.1% to about 10% montan wax, and about 0.1 to 5% by weight of ethylene-vinyl alcohol-vinyl acetate terpolymer.

The wax emulsion may further include other additives, including without limitation additional emulsifiers and stabilizers typically used in wax emulsions, flame retardants, lignocellulosic preserving agents, fungicides, insecticides, biocides, waxes, sizing agents, fillers, binders, additional adhesives and/or catalysts. Such additives are preferably present in minor amounts and are provided in amounts which will not materially affect the resulting composite board properties. Preferably no more than 30% by weight, more preferably no more than 10%, and most preferably no more than 5% by weight of such additives are present in the wax emulsion.

Shown in the below tables are example embodiments of a wax emulsion, although other quantities in weight percent may be used.

TABLE 1

| Raw Material | Quantity in Weight Percent |
| --- | --- |
| Water | 58 |
| Polyvinyl alcohol | 2.70 |
| Dispersant (Optional) | 1.50 |
| Paraffin Wax | 34.30 |
| Montan Wax | 3.50 |
| Biocide | 0.02 |

TABLE 2

| Raw Material | Quantity in Weight Percent |
| --- | --- |
| Water | 58.80 |
| Polyvinyl alcohol | 2.80 |
| Diethanol Amine | 0.04 |
| Paraffin Wax | 34.80 |
| Montan Wax | 3.50 |
| Biocide | 0.10 |

The wax emulsion may be prepared using any acceptable techniques known in the art or to be developed for formulating wax emulsions, for example, the wax(es) are preferably heated to a molten state and blended together (if blending is required). A hot aqueous solution is prepared which includes any additives such as emulsifiers, stabilizers, etc., ethylene-vinyl alcohol-vinyl acetate terpolymer (if present), potassium hydroxide (if present) and lignosulfonic acid or any salt thereof. The wax is then metered together with the aqueous solution in appropriate proportions through a colloid mill or similar apparatus to form a wax emulsion, which may then be cooled to ambient conditions if desired. In some embodiments, the improved wax emulsion may be incorporated with or coated on various surfaces and substrates. For example, the improved wax emulsion may be mixed with gypsum to form a gypsum wallboard having improved moisture resistance properties.

In one embodiment, the wax components may be mixed in an appropriate mixer device. Then, the wax component mixture may be pumped to a colloid mill or homogenizer. In a separate step, water, and any emulsifiers, stabilizers, or additives (e.g., ethylene-vinyl alcohol-vinyl acetate terpolymer) are mixed. Then the aqueous solution is pumped into a colloid mill or homogenizer. These steps may be performed simultaneously, or they may be performed at different times. Pumping of the wax component mixture and that of the aqueous solution may be performed at the same time, so as to ensure proper formation of droplets in the emulsion. In some embodiments, steps wax component mixing and pumping may be performed before mixing of the aqueous solution is started. Finally, the two mixtures are milled or homogenized to form an aqueous wax emulsion.

Some or all steps of the above method may be performed in open vessels. However, the homogenizer, if used, may use pressure in its application.

Advantageously in some embodiments, the emulsion, once formed, is cooled quickly. By cooling the emulsion quickly, agglomeration and coalescence of the wax particles may be avoided.

In some embodiments the wax mixture and the aqueous solution are combined in a pre-mix tank before they are pumped into the colloid mill or homogenizer. In other embodiments, the wax mixture and the aqueous solution may be combined for the first time in the colloid mill or homogenizer. When the wax mixture and the aqueous solution are combined in the colloid mill or homogenizer without first being combined in a pre-mix tank, the two mixtures may advantageously be combined under equivalent or nearly equivalent pressure or flow rate to ensure sufficient mixing.

In some embodiments, once melted, the wax emulsion is quickly combined with the aqueous solution. While not wishing to be bound by any theory, this expedited combination may beneficially prevent oxidation of the wax mixture.

Water-Resistant Exterior Joint Compound

Embodiments of the disclosed wax emulsion can be used to form a water-resistant exterior joint compound. The joint compound can be used to cover, smooth, or finish gaps in exterior sheathing wallboards, such as joints between adjacent boards, screw holes, and nail holes. The joint compound can also be used for repairing surface defects on exterior walls and applying texture to exterior walls amongst numerous other applications. The exterior joint compound can also be specially formulated to serve as a cover coat on cement and concrete surfaces. The exterior joint compound can be particularly useful in locations where there is high humidity, moisture and direct impact from rain, exterior water exposure during construction, and to prevent molding or other deleterious effects.

Wax emulsions can be particularly advantageous for use in a joint compound as compared to, for example, the currently available silyl-terminated polyethers based compounds. The STPEs are expensive and are not water-based, which means an organic solvent must be employed to handle those compounds. Because wax emulsions, such as those described herein, can advantageously increase the adhesion properties of a joint compound, and thus can be added at higher dosage levels.

Embodiments of the exterior joint compound can be applied in thin layers to a surface. The exterior joint compound can be applied by, for example, using a trowel or other straight edged tool. However, the application and thickness of the layers of joint compounds is not limiting. Further, multiple layers may be applied in order to obtain a smooth wall. The number or layers applied is not limiting. In some embodiments, each layer can be allowed to dry prior to application of the next layer. In some embodiments, a second layer can be applied when the first layer is only partially dried. In some embodiments, the joint compound can be spread over mesh or tape used to connect wallboards. In some embodiments, the joint compound may also be used to patch and texture exterior sheathing walls. In some embodiments, the joint compound can be made of water, preservative, calcium carbonate, mica, clay, thickener, binder (e.g., latex binder), and a wax emulsion. In addition to a latex binder, other water soluble binders, such as polyvinyl alcohol, can be used as well. Other materials, such as talc, binders, fillers, thickening agents, preservatives, limestone, perlite, urea, defoaming agents, gypsum latex, glycol, and humectants can be incorporated into the exterior joint compound as well or can substitute for certain ingredients (e.g., talc can be used in place of, or in addition to mica; gypsum can be used in place of, or in addition to calcium carbonate, etc.). In some embodiments, the calcium carbonate can be replaced either wholly or partially with a surface micro-roughened filler that can further enhance the joint compound's hydrophobicity. In some embodiments, Calcimatt™, manufactured by Omya AG, can be used. In some embodiments, cristobalite (silicon dioxide) such as Sibelite® M300, manufactured by Quarzwekre, can be used. These fillers can be used alone or in combination.

In some embodiments, the joint compound can be mixed in water. This mixture can then be applied to a surface, e.g., hole or joint, and can be allowed to dry. Once the water evaporates from the mixture, a dry, relatively hard cementitious material can remain. In one embodiment, the wall system can be made of a plurality of boards. There is no limit to the amount of boards or the positioning of boards next to one another. Where two boards are adjacent to one another, a gap, or joint, can be formed. While the boards themselves may be water-resistant, the joints may allow for moisture to pass through. Therefore, embodiments of the water-resistant joint compound can be spread across the joints. The compound can be spread on the joint to completely cover the joint. In some embodiments, the boards can also contain holes. These holes can be formed by nailing the boards into studs, or other attachment means. Regardless of the reason for the hole, the compound can also be used to cover the holes. The compound can insert partial through the holes, or can cover the top of the holes, or both. The compound can cover any fastener, e.g. a screw or nail that is located in the hole. In some embodiments, the compound for covering and filling the hole are the same compound. The application and thickness of the compounds on the boards is not limiting, and common methods of application can be used.

An exemplary formula range of an embodiment of a water-resistant exterior joint compound using the above disclosed wax is shown in the below table:

TABLE 3

| Component | Range |
| --- | --- |
| Water | 15-40% |
| Defoaming agent | 0.0-0.5% |
| Preservatives | 0.1-1.0% |
| Calcium Carbonate | 10-50% |

TABLE 3-continued

| Component | Range |
|---|---|
| Siliconate | 0-5% |
| Mica | 0-20% |
| Attapulgite Clay | 0-3% |
| Perlite | 0%-15% |
| Wax emulsion | 15-40% |
| Latex binder | 1-10% |
| Cellulose ether thickener | 0.1%-3% |

In the above table, various components of an exemplary joint compound with the weight percent range of each component are provided. It is understood that the range for any component provided herein only reflects an abbreviation of the fact each internal weight percent number for a particular component is disclosed as if fully set forth herein. The specific intermediate weight percent numbers for any component are disclosed at a 0.1 weight percent interval, as if they are fully set forth herein. So, for example, the cellulose ether thickener is disclosed in the range of from about 0.1% to 3%. This means that the following weight percent numbers for cellulose ether thickener are also full set forth herein:
0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, In addition, for the cellulose ether thickener and for other components disclosed herein, the specific component can be present in an amount that is in a range defined by any two numbers disclosed by the above series of numbers, including the end-points of such range. This disclosure instruction applies to every component that is disclosed in the present patent application.

Further, an example of a specific formulation for a water-resistant joint compound can is shown in the below table, although other weight percentages may be used:

TABLE 4

| Component | Weight in (g) |
|---|---|
| Water | 350 |
| Defoaming agent | 1 |
| Preservative Acticide CBM2 | 2 |
| Preservative Acticide CMKW2 | 11.6 |
| Calcium Carbonate (Microwhite 100) | 490 |
| Potassium Siliconate | 3.5 |
| Mica | 150 |
| Attapulgite Clay (Attagel 30) | 12 |
| Expanded Perlite (SilCell 43-32) | 50 |
| AquaDri Wax Emulsion (81061) | 350 |
| Latex binder Acronal NX4787 | 40 |
| Cellulose ether thickener (Methocel 240S) | 4.5 |
| Total solids | 866.6 |
| Total weight | 1464.6 |
| % solids | 59.17% |

The contact angle of a surface coated with the above exterior joint compound formulation was found to be 110, in other words, an hydrophobic surface was generated. Also, the 2-hour Cobb value was found to be at 15 g/m$^2$. The exterior sheathing wallboards have a permeance of 50-100 g/m$^2$. Compared to the exterior wall-boards (sheathing), therefore, the joints have an improved Cobb value. Thus, the joints and holes will not be the weakest link in terms of moisture repellency and protection when the joint compound of the present invention is used to seal the joints, gaps, and holes in the exterior surface on the sheathing walls during construction.

The mold resistance, measured by ASTM G-21 for these exterior sheathing wallboards and the inventive exterior joint compound obtained a "pass" characterization.

The long-term weather resistance for both the exterior sheathing wallboard, and the inventive exterior joint compound was found to be excellent. The exterior joint compound showed no wear with or without fabric reinforcement more than six months after exposure to outside environment. Here, the exterior joint compound was coated on a sheathing wallboard. While the coating without fabric reinforcement showed hairline cracking in the joint (while fabric reinforcement eliminates the hairline crack), this particular type of crack does not factor in the determination of the coating's weatherability because weatherability is confined to coating degradation due to UV, rain, and other environmental conditions.

The wax emulsion used in the joint compound can be formed from slack wax, montan wax, paraffin wax, carnauba wax, tall oil, sunflower wax, rice wax, and any other natural or synthetic wax containing organic acids and/or esters, or waxes that have been described previously. For example, synthetic wax used in the joint compound may comprise ethylenic polymers or hydrocarbon types, optionally derived via Fischer-Tropsch synthesis, or combinations thereof. By way of further example, synthetic wax used in the joint compound may comprise polyethylene glycol, methoxy-polyethylene glycol, or combinations thereof. Optionally, the synthetic waxes can be added in concentrations ranging from about 0.1% to about 8% of the dry weight of the joint compound or from about 0.5% to about 4.0% of the dry weight of the joint compound. In some embodiments, the wax emulsion is stabilized by polyvinyl alcohol.

In some embodiments, perlite can be used in the exterior joint compound to, for example, control the density, shrinkage, and crack resistance of the joint compound. In some embodiments, perlite need not be used (e.g., where weight is not as much of a factor).

In some embodiments, mica can be used in a compound as well. Mica, which is a low bulk density mineral, may be used as a filler or extender, and may also improve crack resistance of the joint compound.

In some embodiments of the exterior joint compound gypsum (calcium sulfate dihydrate) can also be used. Gypsum can be used to replace calcium carbonate, or can be used in conjunction with calcium carbonate. In some embodiments, talc can be included in the exterior joint compound to, for example, enhance application properties and can also be used as a white extender pigment.

In some embodiments, clay can be used in the exterior joint compound as, for example, a non-leveling agent and/or a thickening agent that can control the viscosity or rheology of the final product. Clay can also help enhance or create the water-holding properties of the joint compound.

In some embodiments, thickeners can be used to control the viscosity, affect the rheology, and affect the water holding characteristics of the exterior joint compound. For example, cellulose ether can be used as a thickener.

In some embodiments, binders can be used in the exterior joint compound to, for example, improve bonding to the substrate such as wallboard.

In some embodiments, a glycol can be used in the exterior joint compound to provide functional properties to the exterior joint compound such as wet edge, open time, controlling drying time, and freeze/thaw stability.

In some embodiments, other rheology modifiers can also be used in conjunction with, or instead of, some of the above described compositions.

In some embodiments, fillers can be used in the exterior joint compound. For example, calcium carbonate, calcium sulfate hemihydrate, or calcium sulfate dihydrate can all be used as fillers, though other materials can be used as well. Further, thickeners, preservatives, binders, and other additives can be incorporated into the joint compound.

Other additives can also be added to the described exterior joint compound in addition to the wax emulsion. In some embodiments, metal siliconate salts such as, for example, potassium siliconate, as well as silicone based compounds such as, for example, poly hydrogen methyl siloxane and polydimethyl siloxane, could provide advantageous water resistance to the exterior joint compound. In some embodiments, fluorinated compounds and stearate-based salts could also be used to provide advantageous water resistance.

In some embodiments, the wax emulsion can be replaced by other materials (or used in combination with other materials) which may also increase the water repellency of the exterior joint compound. For example, metal siliconate salts such as, for example, potassium siliconate, as well as silicone based compounds such as, for example, poly hydrogen methyl siloxane and polydimethyl siloxane, could be used in place of the wax emulsion (or in combination with the wax emulsion). In some embodiments, fluorinated compounds and stearate-based salts could also be used instead of the wax emulsion or in combination with the wax emulsion. The compounds described in this paragraph can be used alone as a replacement for wax emulsion, or can be used in combination with each other.

In some embodiments, the disclosed exterior joint compound can cover a joint or hole and provide resistance to water penetration. Further, the exterior joint compound is formulated to properly adhere to any boards that the compound is placed onto. Further, the exterior joint compound can have adequate sag resistance, compatibility, and contact angle.

In some embodiments, the exterior joint compound can provide water repellency. One indication of water repellency is the contact angle of a water droplet on the surface of the dried joint compound. A water droplet surface that has a contact angle of less than 90 degrees would generally be considered hydrophilic (the smaller the contact angle the greater the hydrophilicity). Conversely, surfaces that cause a water droplet to have a contact angle greater than 90 degrees are generally considered hydrophobic. Commercially available ready mix joint compound have contact angles of about zero degrees, meaning that a drop of water placed on such a surface will rapidly spread and wet out on the surface.

Some embodiments of the disclosed exterior joint compound, containing a wax emulsion, can have an average contact angle of about 98 degrees (based on an average of six measurements), or greater than about 98 degrees, indicating a hydrophobic surface. This contact angle value can be modified, higher or lower, by adjusting the dosage level of the wax emulsion in the exterior joint compound formula. In some embodiments, the contact angle can be between about 60 to about 150 degrees, or about 60, about 70, about 80, about 90, about 100, or about 110 degrees. In some embodiments, the joint compound can have a contact angle of greater than about 60, greater than about 70, greater than about 80, greater than about 90, or greater than about 100. In other words, the contact angle can be: 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 14, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, and 150.

In addition, the contact angle of the exterior joint compound is in a range defined by any two numbers disclosed by the above series of numbers, including the end-points of such range.

In some embodiments, the disclosed exterior joint compound can be resistant to seepage of water into itself. This attribute can be generally determined by measuring the Cobb value of the compound. A Cobb value is a quantitative determination of how much water a substrate absorbs in a predetermined timeframe per unit area, generally measured as grams of water absorbed in 2 hours by a one square meter area. For example, a leveled surface of an embodiment of the disclosed exterior joint compound is applied on to a piece of commercially available regular ½" gypsum wallboard. A 100 cm$^2$ Cobb testing ring is then fitted on top of the joint compound and the ring filled with 100 grams of water to begin the test. After two hours, the water is discarded and the Cobb ring disassembled. The wallboard/joint compound combination is then weighed to determine how much water is absorbed. This gram weight of water is multiplied by 100 to give the Cobb value of water absorbed per square meter. Exterior sheathing wallboard (upon which the exterior joint compound is applied) has a Cobb value of less than 100 g/m$^2$. The exterior joint compound of the present invention can be formulated to match the Cobb value of its substrate (the sheathing board), 100 g/m$^2$ and below. In some embodiments, the desired Cobb value can be obtained by adjusting the composition of the wax emulsion and the siliconate content in the formulation, for example, potassium siliconate. In some embodiments, a 2-hr Cobb values is below about 100 g/m$^2$. Stated another way, the Cobb value of the exterior join compounds of the present invention can be 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, and 100.

In addition, in some embodiments, the Cobb value of the exterior joint compound is in a range defined by any two numbers disclosed by the above series of numbers, including the end-points of such range.

A metal ring of 2.5" internal diameter (and ⅖" internal height) is placed on a silicone coated paper (for non-stick). A sample of conventional ready-mixed interior joint compound used for interior gypsum wallboards is then applied inside the ring such that it occupies the entire open volume of the ring. The conventional joint compound is allowed to dry on a lab bench overnight, then transferred into a forced air oven at 50° C. where drying is continued for another 5 hours (until constant weight) to form a patty. The same procedure is performed with the disclosed wax emulsion based exterior joint compound, forming a second patty. The patties are then lightly sanded all around (to ensure patty smoothness), weighed, and then submerged in a water bath in a manner similar to ASTM Method C473. To prevent sample flotation when in the water, a 100 gram weight is placed on each sample through the duration of the test. As in ASTM C473, the joint compound patties are removed from the water bath after 2 hours, excess water patted off, and weighed. The results of the testing are shown in the below table.

TABLE 5

| Joint compound | Sample condition |
|---|---|
| Sheetrock Lightweight Dust Control | Broke apart |
| Disclosed Joint Compound with 6.7% Wax Emulsion | Maintained structural and dimensional integrity |

While the commercial joint compound crumbles at the end of the test and could not be reused or retested, the patty containing the disclosed wax emulsion exterior joint compound retains its structural and dimensional integrity. The patty containing the disclosed wax emulsion is in fact dried and then re-submerged to repeat the test. In some embodiments, the wax emulsion joint compound can have a % water absorbance from about 4 to about 6. In some embodiments, the wax emulsion joint compound can have a % water absorbance of about 6 or less, about 5.4 or less, about 5.2 or less, or about 4 or less. The structural and dimensional integrity of the wax emulsion containing patty remains intact and unchanged through the third testing cycle, suggesting that it can continue to survive multiple cycles of submersion and retesting. By contrast, the standard commercially available joint compound cannot survive a single test cycle. Standard interior joint compounds typically have a pH of 8-9, primarily as a result of the high calcium carbonate content. However, it can be undesirable for the pH of joint compound to be much higher than 9.0 because of the corrosive effects such high pH would have on worker's finishing tools as well as on the skin. Advantageously, the wax emulsion used in embodiments of the disclosed exterior joint compound can have a pH of between 7.0 and 8.0, meaning that adding it as a component in the exterior joint compound formulation does not result in an overall increase in the pH of the exterior joint compound. This can advantageously be done without the addition of an acid. Accordingly, the pH of the joint compound can be about 7.0 or about 8.0, or below about 9.0 or below about 8.0.

In some embodiments, the exterior joint compound may contain a biocide in an effective amount. In one embodiment, the biocide content range from about 0.1% to about 5% by weight of the joint compound. In other words, the biocide content can be have the following content in percentage weight: 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0. The biocide weight content can also be in a range determined by any two of these numbers as endpoints, and including the endpoints. Exemplary biocides may include, without limitation silver-containing materials, gold-containing materials, aluminum-containing materials, copper-containing materials, fungicides, antimycotics, bactericides, viricides, carbamates, triclosan, or mixtures of the same. Commercially available fungicides include the Acticide® series from Thor Specialties, Inc., Shelton, Conn.; and the Nuocide® series available from International Specialty Products, Cranbury, N.J. Depending on the end use of the exterior joint compound, the specific biocide used may be targeted to the organisms that are likely to be encountered in the end use environment. For example, if the exterior joint compound is used in a residential or commercial building, the selected biocide(s) may include a fungicide or other antimycotic. If the exterior joint compound is used to seal the gaps between sheathing wallboard for a building that houses a food processing or storage facility or medical facility, the selected biocide(s) may include bactericides and/or viricides.

The biocide should be present in the exterior joint compound must be in an amount sufficient to exhibit a level of microbe mitigating activity when such joint compound is applied to the sheathing wallboards. As appreciated by one of ordinary skill in the art, such amount will necessarily be variable depending on numerous factors, such as the nature and number of other components present in the joint compound, the specific biocide(s) used, and the level of microbe mitigating activity desired in the end product.

While the above detailed description has shown, described, and pointed out features as applied to various embodiments, it will be understood that various omissions, substitutions, and changes in the form and details of the devices or algorithms illustrated can be made without departing from the spirit of the disclosure. For example, certain percentages and/or ratios of component ingredients have been described with respect to certain example embodiments; however, other percentages and ratios may be used. Certain process have been described, however other embodiments may include fewer or additional states. As will be recognized, certain embodiments of the inventions described herein can be embodied within a form that does not provide all of the advantages, features and benefits set forth herein, as some features can be used or practiced separately from others.

What is claimed is:

1. A water-resistant joint compound, comprising:
   (I) water;
   (II) a binder;
   (III) a filler;
   (IV) a wax emulsion, comprising:
      (a) a wax selected from at least one natural wax, at least one synthetic wax, and a combination thereof,
      (b) a base selected from at least one metal hydroxide, at least one non-metallic base, and combinations thereof,
      (c) optionally, a dispersant having a sulfur-containing group,
      (d) a stabilizer comprising a polymer capable of hydrogen bonding to carboxylate moieties at the water/paraffin interface;
   (V) at least one silicone, at least one siliconate, at least one fluorinated compound, at least one stearate, at least one stearate-based salt, or a combination thereof.

2. The water-resistant joint compound as recited in claim 1, wherein said binder is a latex binder.

3. The water-resistant joint compound as recited in claim 1, wherein said filler is selected from calcium carbonate, attapulgite clay, cristobalite, gypsum, mica, clay, talc, perlite, expanded perlite, a micro-roughened filler, and combinations thereof.

4. The water-resistant joint compound as recited in claim 1, wherein:
   said at least one natural wax is selected from at least one plant-based wax, at least one animal-based wax, at least one mineral wax, and combinations thereof; and
   said at least one synthetic wax is selected from waxes based on ethylenic polymers, waxes based on polypropylene, waxes based on polyethylene, waxes based on polytetrafluoroethylene, waxes based on fatty acid amines, Fischer Tropsch waxes, waxes comprising polyethylene glycol, waxes comprising methoxy polyethylene glycol, and combinations thereof.

5. The water-resistant joint compound as recited in claim 4, wherein said at least one synthetic wax content is in the range of from about 0.1% to about 8% of the dry weight of said water resistant joint compound.

6. The water-resistant joint compound as recited in claim 4, wherein:
said at least one plant-based wax is selected from carnauba wax, candelilla wax, ouricury wax, jojoba wax, bayberry wax, Japan wax, sunflower wax, tall oil, rice wax, a wax containing organic acids, a wax containing organic esters, a wax containing organic acids and esters, and combinations thereof;
said at least one animal-based wax is selected from beeswax, insect wax, spermaceti, lanolin, lanocerin, shellac, ozokerite and combinations thereof; and
said at least one mineral wax is selected from montan wax, slack wax, paraffin wax, microcrystalline wax, intermediate wax, macrocrystalline wax, petrolatum, and combinations thereof.

7. The water-resistant joint compound as recited in claim 4, wherein said wax is selected from slack wax, montan wax, paraffin wax, and a combination thereof, and wherein said wax content is from about 30% to about 60%, by weight of said wax emulsion.

8. The water-resistant joint compound as recited in claim 1, wherein said at least one metal hydroxide is selected from potassium hydroxide, aluminum hydroxide, barium hydroxide, calcium hydroxide, lithium hydroxide, magnesium hydroxide, sodium hydroxide, zinc hydroxide, and combinations thereof.

9. The water-resistant joint compound as recited in claim 1, wherein said potassium hydroxide is wax emulsion, potassium hydroxide is present in an amount of from about 0.1% to about 1% by weight of the wax emulsion.

10. The water-resistant joint compound as recited in claim 1, wherein said dispersant having a sulfur-containing group is selected from lignosulfonate, lignosulfonic acid, naphthalene sulfonic acid, sulfonate salt of lignosulfonic acid, sulfonate salt of naphthalene sulfonic acid, and combinations thereof.

11. The water-resistant joint compound as recited in claim 1, wherein said stabilizer is selected from polyvinyl alcohol, hydrolyzed polyvinyl alcohol, ethylene-vinyl alcohol-vinyl acetate terpolymer, vinyl alcohol-vinyl acetate-silyl ether terpolymer, and combinations thereof.

12. The water-resistant joint compound as recited in claim 11, wherein said polyvinyl alcohol is hydrolyzed in the range of from about 80% to about 100% hydrolyzed polyvinyl acetate.

13. The water-resistant joint compound as recited in claim 12, wherein said polyvinyl alcohol is in the range of from about 0.1% to about 5% by weight of the wax emulsion.

14. The water-resistant joint compound as recited in claim 1, wherein said at least one silicone is selected from poly hydrogen methyl siloxane, polydimethyl siloxane, and combinations thereof.

15. The water-resistant joint compound as recited in claim 1, wherein
said at least one siliconate is selected from metal siliconate, metal siliconate salts, and combinations thereof.

16. The water-resistant joint compound as recited in claim 1, further comprising:
(a) optionally, a preservative,
(b) optionally, a defoaming agent, and
(c) an effective amount of biocide.

17. The water-resistant joint compound as recited in claim 16, wherein said biocide content is in the range of from about 0.1% to about 5% by weight of the water-resistant joint compound.

18. The water-resistant joint compound as recited in claim 16, wherein said biocide comprises one or more silver-containing material, one or more gold-containing material, one or more aluminum-containing material, one or more copper-containing material, one or more fungicide, one or more antimycotic, one or more bactericide, one or more viricide, one or more carbamate, triclosan, or mixtures thereof.

19. The water-resistant joint compound as recited in claim 1, characterized by a % water absorbance from about 4 to about 6.

20. The water-resistant joint compound as recited in claim 1, wherein said wax emulsion is characterized by a pH in the range of 7.0 to about 8.0.

* * * * *